United States Patent [19]

Mitchell

[11] 3,964,582
[45] June 22, 1976

[54] FAN DRIVE HYDRAULIC COUPLING

[75] Inventor: Roland J. Mitchell, Indianapolis, Ind.

[73] Assignee: Wallace-Murray Corporation, New York, N.Y.

[22] Filed: July 26, 1974

[21] Appl. No.: 492,260

[52] U.S. Cl. ............................. 192/58 B; 428/419
[51] Int. Cl.² ..................... F16D 31/00; B44D 1/34
[58] Field of Search .......... 192/58 R, 58 B; 117/49, 117/132 C; 260/327

[56] References Cited
UNITED STATES PATENTS

| | | |
|---|---|---|
| 3,194,372 | 7/1965 | Weir.................................. 192/58 B |
| 3,354,129 | 11/1967 | Edmonds, Jr. et al. ...... 117/132 C X |
| 3,464,845 | 9/1969 | Osborn et al. ........................ 117/49 |
| 3,634,125 | 1/1972 | Tieszen................................ 117/49 |

Primary Examiner—Samuel Scott
Assistant Examiner—Lance W. Chandler
Attorney, Agent, or Firm—Thomas J. Greer, Jr.

[57] ABSTRACT

A fan drive structure for the cooling system of an internal combustion engine. A drive disc rotates within a housing cavity having a silicone oil therein. The housing carries a fan. The improvement comprising coating the sides of the drive disc with a polyphenylene sulfide material. The material coating functions as an anti-friction and bearing surface.

6 Claims, 2 Drawing Figures

U.S. Patent   June 22, 1976   3,964,582
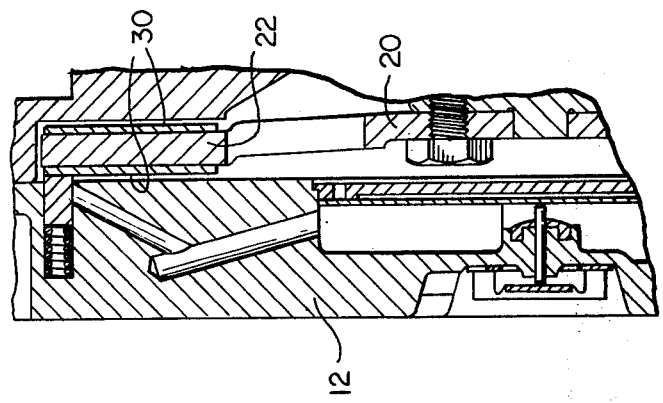
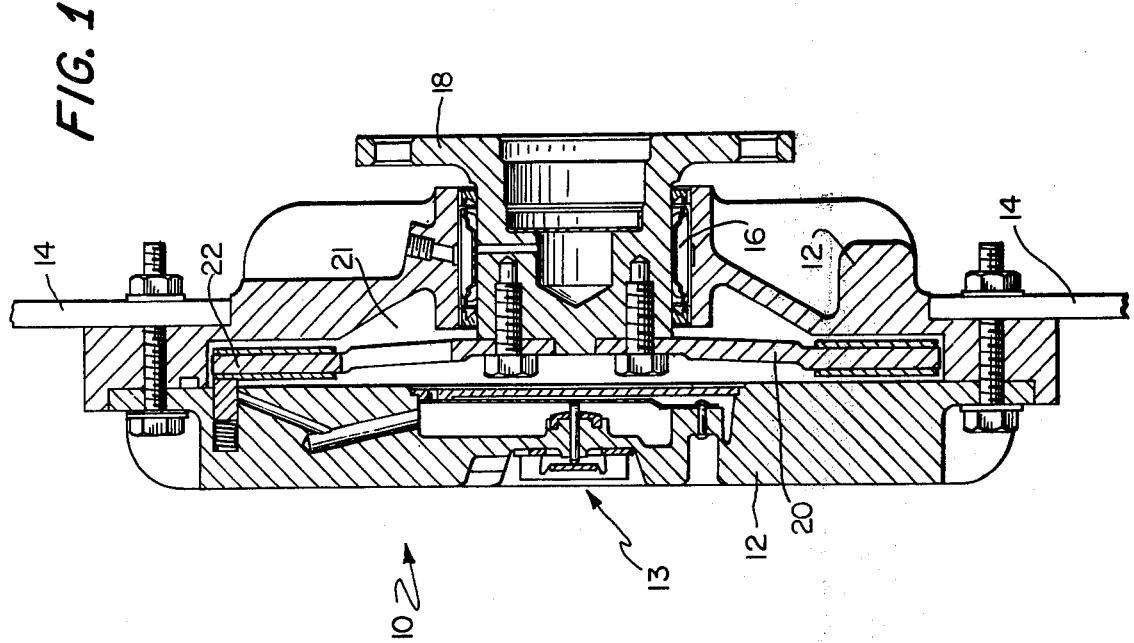

FAN DRIVE HYDRAULIC COUPLING

This invention relates to a fan drive structure particularly adapted for the cooling system of an internal combustion engine. In such engines, it is the practice to place a fan adjacent the radiator with the coolant liquid, usually water, passing through the motor and to the radiator where the air is driven therethrough by the fan causes the coolant to give up its heat prior to the next travel through the engine. In this manner, the temperature of the engine is maintained lower than would otherwise be the case. A variety of fan configurations and fan drives have evolved, one type of which has gained increasing popularity in recent times, and to which this invention is concerned, is a so-called shear-type fluid coupling.

In a shear-type fluid coupling, the fan is secured to a housing and the housing has a cavity at least partially filled with, for example, a silicone oil. A drive disc fits into the cavity and the drive disc is coupled to the internal combustion engine. The fan speed is a function of the force or torque transmitted through the silicone oil from the drive disc to the housing, the silicone oil being the only connection whereby such torque may be transferred. The degree of coupling and accordingly the fan speed is quite often a function of the temperature of the oil or the temperature of some valve mechanism or element associated with the oil. The capacity of a given size fan drive is proportional to the viscosity of the oil and to its thickness, as well as the shear area and the mean radius of the area. Such shear-type fluid couplings are well known in the art and examples are illustrated by the following U.S. Patents, assigned to the assignee of this invention: U.S. Pat. Nos. 3,053,363; 3,155,209; 3,194,372; 2,963,135; and 3,007,560.

As illustrated by these U.S. patents, it has often been the custom to line the outermost flat, opposite surfaces of the drive disc with a material such as brake lining for automobile brakes. The purpose of such coating or lining is to provide a bearing surface in case of misalignment of the drive disc with respect to the driven housing. Thus, should the housing tilt during operation with respect to the drive disc, the edges of the flat surfaces of the disc will contact certain portions of the interior cavity. Such continued contact, unless provided for, results in wear of the surfaces and consequent decrease in the performance of the shear-type fan drive. Further, even with perfect axial alignment, the bearing surfaces are in contact due to fan thrust loads.

According to the practice of this invention, the sides of the drive disc are coated with a polyarylene sulfide coating. The polyarylene sulfides which may be employed include polyphenylene sulfide, polynaphthylene sulfide, polyanthracene sulfide and the lower alkyl substituted derivatives thereof. The polyarylene sulfide which is preferred is polyphenylene sulfide.

Polyphenylene sulfide has been found to exhibit durability and other desirable performance characteristics. Other resins, such as Teflon, have been attempted as bearing materials in this environment but have proven unsatisfactory. The polyphenylene sulfide employed may be obtained under the tradename Ryton, this being a registered trademark for a brand of polyphenylene sulfide marketed by Phillips Petroleum Company. The polyphenylene sulfide may also include a filler such as glass beads, glass powder, or glass fibers. Other examples of fillers are polytetrafluoroethylene (Teflon) powder, molylodenum sulfide, titanium dioxide, and metallic particles, such as iron, copper, etc. The polyphenylene sulfide may be applied as a powder or a slurry. The material may be sprayed upon the surfaces of the drive disc, or it may be sintered, or it may be applied by fluidized bed coating. After such application, induction heating or any other standard heating method may be employed.

The plastic coating of metals is itself quite old. Various plastics have long been employed to coat different metallic substrates for a variety of reasons, such as corrosion protection, chemical resistance, and changing of metal surface friction characteristics. Previous attempts, in this art, however, to coat a fan drive disc with plastic materials have been unsuccessful. Coating materials such as Teflon, various epoxy resins, etc., have been attempted. No one of such resins, either filled or unfilled, possess the required combination of toughness, abrasion resistance, heat resistance and chemical resistance necessary to provide a workable or functional coating for the particular application of a shear-type fan drive. The coating material of this invention, however, has been found satisfactory in that it possesses the required mechanical wear properties, heat resistance and chemical resistance to remain unaffected by the silicone fluid in which the fan drive disc operates and is partially immersed.

The coating of polyphenylene sulfide may be applied by various known techniques and the consequent curing is generally carried out when the drive disc or substrate is at least 700°F. In one such technique, the drive disc metal surface is degreased with a solvent such as trichloroethylene or acetone. In the event that the metal is an aluminum disc, the surface to be coated should be grit blasted with 100 grit alumina and then degreased with a suitable solvent. After removal of the grit, the surface is ready for coating with the resin. If steel is the metal substrate, it should be grit blasted with 100 grit alumina and degreased. After the grit has been cleaned off, the surface may be flame treated with an oxygen torch until a blue-gray color is obtained. Alternatively, the steel substrate may be heated in air at a temperature of 700°F until a blue-gray color is obtained. Yet another method is to apply a prime coat of up to 3 mils of equal parts of Ryton and cobalt oxide to the surface which has been brought up to a temperature of 700°F, followed by baking for 30 minutes. In the event that cast iron is the metal substrate, it may be somewhat porous and should be grit blasted, air cleaned, and then baked thoroughly at 700°F or above to remove any foreign material. With titanium as the metal substrate, the surface should be grit blasted and degreased, and then heated to 700°F prior to coating with the Ryton. Other metal such as brass, bronze, alumina steel and stainless steel may be coated with Ryton using the procedure illustrated above for aluminum. These and other details of applying the polyphenylene sulfide resin to the metal substrate are known. Reference to U.S. Pat. No. 3,354,129 issued to Edmunds, U.S. Pat. No. 3,616,186 issued to Blackwell, and U.S. Pat. No. 3,634,125 issued to Tieszen may be consulted regarding additional details of coating of a metal substrate with polyphenylene sulfide and the teachings of these patents are hereby incorporated by reference.

IN THE DRAWINGS

FIG. 1 is a cross-sectional view of a typical shear-type fan drive of the temperature responsive variety which is made and sold by the assignee of this invention.

FIG. 2 is an enlarged view of a portion of FIG. 1.

Referring now to the drawings, the numeral 10 illustrates a cross-section of a typical shear drive and temperature responsive fan coupling of the type manufactured by the assignee of this invention. The drive includes a two-part aluminum housing 12 having a mechanism 13 responsive to temperature and including a valve means for controlling the flow of a viscous fluid. The details of operation of the elements indicated by means 13 are known and form no part of this invention. The numeral 14 denotes the radially innermost portion of a spider of a fan which is coupled to the rotatable housing 12, all in a known manner. The numeral 16 denotes any desirable bearing arrangement for receiving hub element 18, the latter adapted to be secured to a rotating shaft of an internal combustion engine. The numeral 20 denotes a drive disc, which may be of steel, suitably secured as indicated to rotating hub member 18. The drive disc 20 is positioned within cavity 21 of housing 12. The numeral 22 denotes the radially outermost portions of the drive disc. The elements thus far described are often placed just behind a radiator of an internal combustion engine cooling system and in front of the engine itself.

Referring now to FIG. 2 of the drawings, an enlarged portion of the drive disc 20 is illustrated and includes a coating 30 on a portion of both sides of the drive disc 20, in this case the radially outermost portion 22. The coating, according to the practice of this invention, is polyphenylene sulfide which may be obtained from Phillips Petroleum Company under the brand name Ryton. The manner of applying the resin to the discs is known. In general, the same application techniques are employed whether the material only or the material and a filler are applied.

The coating 30 is seen to protect the contiguous surface of the housing cavity whenever the housing and drive disc rub against one another. In one test comparison the Ryton brand polyphenylene sulfide coating, applied in a thickness of one to five mils, both with and without a filler, performed satisfactorily for 200 hours. When Teflon coating was employed, however, coating failed after only five or six hours with consequent metal-to-metal abrasion between the drive disc and housing cavity. In another test, similar results were observed with cork bonded to the drive disc in lieu of coating 30, the cork failing after a short time.

What is claimed is:

1. A shear type hydraulic coupling adapted for use in the cooling system of an internal combustion engine, a housing having a cavity therein containing a shear fluid, a drive disc adapted to be rotated by an engine, said drive disc positioned within said cavity to transmit torque from the disc through the shear fluid to the housing, the housing adapted to carry a fan, a portion of the sides of said drive disc being contiguous to at least a portion of the interior surfaces of said housing cavity, the improvement comprising, a polyarylene sulfide material coating on at least a portion of the sides of said drive disc.

2. The coupling of claim 1 wherein said material includes a filler.

3. The coupling of claim 2 wherein said filler is glass beads, glass powder, glass fibers, polytetrafluoroethylene powder, Molybdenum sulfide powders, $TiO_2$ powder, metallic particles, or asbestos fibers.

4. The coupling of claim 1 wherein said material is polyphenylene sulfide.

5. The coupling of claim 2 wherein said material is polyphenylene sulfide.

6. The coupling of claim 3 wherein said material is polyphenylene sulfide.

* * * * *